US012802420B2

(12) United States Patent
Lim

(10) Patent No.: US 12,802,420 B2
(45) Date of Patent: Nov. 17, 2026

(54) ELECTRONIC DEVICE AND DATA SELECTION METHOD THEREOF

(71) Applicants: HYUNDAI MOTOR COMPANY, Seoul (KR); Kia Corporation, Seoul (KR)

(72) Inventor: Hyun Kyu Lim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 219 days.

(21) Appl. No.: 18/914,993

(22) Filed: Oct. 14, 2024

(65) Prior Publication Data

US 2025/0157203 A1 May 15, 2025

(30) Foreign Application Priority Data

Nov. 13, 2023 (KR) ........................ 10-2023-0156606

(51) Int. Cl.

| | |
|---|---|
| ***G06V 10/778*** | (2022.01) |
| ***G06T 7/50*** | (2017.01) |
| ***G06T 7/62*** | (2017.01) |
| ***G06V 10/74*** | (2022.01) |
| ***G06V 10/764*** | (2022.01) |
| ***G06V 20/58*** | (2022.01) |
| ***H04N 23/61*** | (2023.01) |

(52) U.S. Cl.

CPC .............. *G06V 10/778* (2022.01); *G06T 7/50* (2017.01); *G06V 10/761* (2022.01); *G06V 20/58* (2022.01); *H04N 23/61* (2023.01); *G06T 2207/20076* (2013.01); *G06T 2207/20081* (2013.01); *G06V 2201/08* (2022.01)

(58) Field of Classification Search

CPC .... G06V 10/778; G06V 10/761; G06V 20/58; G06V 2201/08; G06V 10/764; G06V 10/82; G06V 10/7753; G06V 10/12; G06V 20/64; G06T 7/50; G06T 2207/20076; G06T 2207/20081; G06T 7/62; G06T 2210/12; H04N 23/61; G06N 3/08

See application file for complete search history.

(56) References Cited

U.S. PATENT DOCUMENTS

| | | | | |
|---|---|---|---|---|
| 11,200,679 | B1 * | 12/2021 | Li | G06T 7/77 |
| 2021/0166436 | A1 * | 6/2021 | Zhang | H04N 19/90 |
| 2021/0334995 | A1 * | 10/2021 | Spence | G06T 7/60 |
| 2022/0147762 | A1 * | 5/2022 | Kang | G06F 18/214 |

* cited by examiner

*Primary Examiner* — Siamak Harandi

(74) *Attorney, Agent, or Firm* — Morgan, Lewis & Bockius LLP

(57) ABSTRACT

An electronic apparatus and a data selection method thereof. The electronic apparatus includes a camera that obtains an image and a processor that detects an object from the image. The processor estimates a distance of the detected object, determines a weight based on the estimated distance, applies the determined weight to determine entropy, and determines whether to obtain data of the detected object based on the determined entropy.

18 Claims, 8 Drawing Sheets

430 440

| | | | | |
|---|---|---|---|---|
| DIVISION (2D SIZE) | | | ... | |
| DISTANCE AVERAGE | 3.85m | 7.7m | - | 87.5m |
| DISTANCE | min | - | - | max |

FIG.4B

| DIVISION (2D SIZE) |  |  | ... |  |
|---|---|---|---|---|
| DISTANCE AVERAGE | 3.85m | 7.7m | ~ | 87.5m |
| DISTANCE | min | - | - | max |
| TARGET RATE | 4 | 1 | : | 1 |
| CURRENT RATE | 10 | 1 | : | 1 |

ELECTRONIC DEVICE AND DATA SELECTION METHOD THEREOF

CROSS-REFERENCE TO RELATED APPLICATION

The present application claims priority to Korean Patent Application No. 10-2023-0156606, filed on Nov. 13, 2023, the entire contents of which is incorporated herein for all purposes by this reference.

BACKGROUND OF THE PRESENT DISCLOSURE

Field of the Present Disclosure

The present disclosure relates to an electronic device and a data selection method thereof.

Description of Related Art

Active learning is a task for selecting data which may be most effective for training a model among pieces of unlabeled data. Entropy-based active learning is widely used, but is only used to solve a data imbalance problem for each class. In other words, the entropy-based active learning is used to select an image of an object which belongs to a class which lacks object data.

When there is an object close to a camera when ground truth (GT) for detecting a three-dimensional (3D) object is obtained, because a long-range object is covered by the object, many pieces of short-range object data are obtained. Due to the provided configuration, an imbalance problem between the short-range data and the long-range data occurs as well as data imbalance for each class.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic device for obtaining object data for each distance in a balanced manner as well as object data for each class and a data selection method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an electronic device may include a camera that obtains an image and a processor which is configured to detect an object from the image. The processor may estimate a distance of the detected object, may be configured to determine a weight based on the estimated distance, may determine entropy by use of the determined weight, and may be configured to determine whether to obtain data of the detected object based on the determined entropy.

The processor may search for a box size which is most similar to a size of the detected object with reference to a lookup table and may estimate a distance mapped to the found box size as the distance of the detected object.

The processor may match and classify an object with a size which is most similar for each predetermined box size to previously obtained objects, may be configured to determine an average distance of the classified objects for each box size, and may be configured to determine the determined average distance as an object distance according to the box size.

The electronic device may further include a memory operatively connected to the processor and storing the lookup table in which the object distance the box size is defined.

The processor may set a data acquisition target rate corresponding to the estimated distance, may verify a data acquisition current rate corresponding to the estimated distance, and may be configured to determine the weight using the data acquisition target rate and the data acquisition current rate.

The processor is further configured to determine the entropy by use of the determined weight and a probability value of a probability that the detected object will belong to a predetermined class.

The processor is configured to determine whether the entropy is greater than or equal to a predetermined reference value and may select the data of the detected object as data needed to generate ground truth (GT) data based on concluding that the entropy is greater than or equal to the reference value.

The processor may detect the object from the image using a deep learning network.

The deep learning network may output a probability value of a probability that the detected object will belong to an ith class.

According to another aspect of the present disclosure, a data selection method of an electronic device may include obtaining an image using a camera, detecting an object from the image, estimating a distance of the detected object, determining a weight based on the estimated distance, determining entropy by use of the determined weight, and determining whether to obtain data of the detected object based on the determined entropy.

The estimating of the distance of the object may include searching for a box size which is most similar to a size of the detected object with reference to a lookup table and estimating a distance mapped to the found box size as a distance of the detected object.

The data selection method may further include matching and classifying an object with a size which is most similar for each predetermined box size to previously obtained objects, determining an average distance of the classified objects for each box size, and determining the determined average distance as an object distance according to the box size.

The data selection method may further include generating the lookup table using the object distance according to the box size and storing the lookup table in a memory operatively connected to the processor.

The determining of the weight may include setting a data acquisition target rate corresponding to the estimated distance, verifying a data acquisition current rate corresponding to the estimated distance, and determining the weight using the data acquisition target rate and the data acquisition current rate.

The determining of the entropy includes determining the entropy by use of the determined weight and a probability value of a probability that the detected object will belong to a predetermined class.

The determining of whether to obtain the data of the object may include determining whether the entropy is greater than or equal to a predetermined reference value and selecting the data of the detected object as data needed to generate ground truth (GT) data based on concluding that the entropy is greater than or equal to the reference value.

The detecting of the data may include detecting the object from the image using a deep learning network.

The detecting of the data may include outputting, by the deep learning network, a probability value of a probability that the detected object will belong to an ith class.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4B is a drawing for describing distance mapping for each object according to various exemplary embodiments of the present disclosure;

Figure 1:
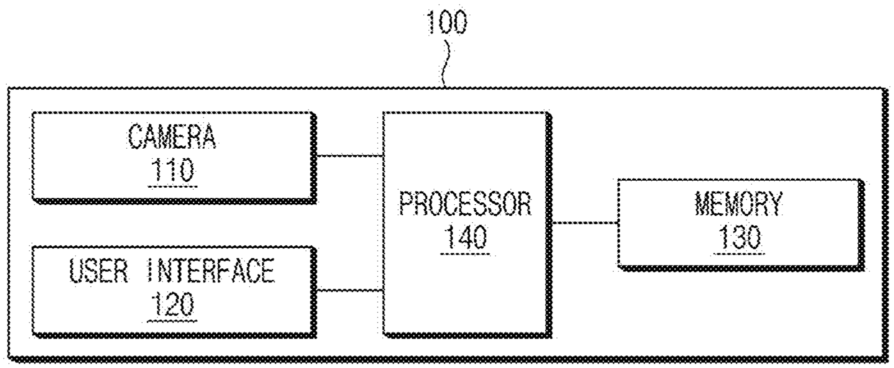
FIG. 1 is a block diagram illustrating a configuration of an electronic device according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical component is designated by the identical numerals even when they are displayed on other drawings. Furthermore, a detailed description of well-known features or functions will be ruled out in order not to unnecessarily obscure the gist of the present disclosure.

In describing components of exemplary embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein include the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an electronic device according to various exemplary embodiments of the present disclosure.

An electronic device 100 may be mounted on a vehicle. As shown in FIG. 1, the electronic device 100 may include a camera 110, a user interface 120, a memory 130, and a processor 140.

The camera 110 may obtain an image around itself. For example, when the camera 110 is mounted on the vehicle, it may capture the periphery of the vehicle. The camera 110 may store the captured image in the memory 130 or may directly transmit the captured image to the processor 140.

The camera 110 may include at least one of image sensors such as a charge coupled device (CCD) image sensor, a complementary metal oxide semi-conductor (CMOS) image sensor, a charge priming device (CPD) image sensor, or a charge injection device (CID) image sensor. The camera 110 may include an image processor for performing image processing such as noise cancellation, file compression, image quality adjustment, and/or saturation adjustment, for an image obtained by the image sensor.

The user interface 120 may be a device which helps the electronic device 100 and a user to interact with each other. The user interface 120 may include an input device (e.g., a keyboard, a touch pad, a microphone, a touch screen, and/or the like) for generating data according to manipulation of the user, an output device (e.g., a display, a speaker, a tactile signal output device, and/or the like) for outputting information according to an operation of the electronic device 100, and/or the like.

The memory 130 may store a plurality of pieces of box size information predetermined by a system designer. The memory 130 may store a lookup table in which a distance according to a predetermined box size is defined. The memory 130 may store a deep learning network, a data selection algorithm, and/or the like. The memory 130 may include training data, ground truth (GT) data, and the like.

The GT data may be used as validation data. The memory 130 may store setting information which is previously set.

The memory 130 may be a non-transitory storage medium which stores instructions executed by the processor 140. The memory 130 may include at least one of storage media such as a flash memory, a hard disk, a solid state disk (SSD), a random access memory (RAM), a static RAM (SRAM), a read only memory (ROM), a programmable ROM (PROM), an electrically erasable and programmable ROM (EEPROM), or an erasable and programmable ROM (EPROM).

The processor 140 may be configured for controlling the overall operation of the electronic device 100. The processor 140 may include at least one of processing devices such as an application specific integrated circuit (ASIC), a digital signal processor (DSP), a programmable logic device (PLD), a field programmable gate array (FPGA), a central processing unit (CPU), a microcontroller, or a microprocessor.

The processor 140 may statistically analyze a distance according to a box size using a dataset for a previously obtained object (e.g., a car, a bus, a truck, and/or the like). The dataset may include pieces of data for object. The data for each data (i.e., object data) may include an object size, a distance (or an object distance) from a reference point (e.g., a position at which the camera 110 is provided, a position of the bumper of a vehicle, or the like), an object class, and/or the like.

The processor 140 may compare an object size included in previously obtained object data with a predetermined box size. Herein, the object size may include a width and a height of a bounding box surrounding the object. The processor 140 may match a box size with the most similar size to the object size. In other words, the processor 140 may classify object data for each object size with reference to the predetermined box size.

The processor 140 may be configured to determine an average distance of objects using object distances included in the pieces of classified object data. In other words, the processor 140 may be configured to determine an average distance of objects matched with the predetermined box size. The processor 140 may define an object distance for each predetermined box size using the determined average distance to generate a lookup table.

The processor 140 may obtain an image by the camera 110. The processor 140 may input the obtained image to a deep learning network (or a deep learning model). The deep learning network may detect an object from the image and may be configured to determine a probability value for each class for the detected object. For example, the deep learning network may be configured to determine and output each of a probability that the object detected from the image will be a vehicle, a probability that the object will be a bus, and a probability that the object will be a truck.

The processor 140 may estimate a distance (or an object distance) from the reference point to the detected object based on a size of the object detected by the deep learning network. The processor 140 may search for a box size similar to a size of a bounding box of the detected object with reference to the lookup table stored in the memory 130 and may map a distance according to the found box size.

The processor 140 may set a target rate (or a data acquisition target rate) at which data for the object corresponding to the mapped distance is desired to be obtained. The target rate may be preset by the system designer. The data acquisition target rate refers to the ratio of the target number of object images of a given size to the number of object images acquired for each of the different sizes. The processor 140 may verify a data acquisition current rate (or a current rate) of the data for the object corresponding to the mapped distance. The data current acquisition rate refers to the ratio between the number of object images acquired for each size by class classification (i.e. before applying entropy weights) based on entropy-based active learning.

The processor 140 may be configured to determine an adaptive weight W using a target rate $R_{tar}$ and a current rate R. The adaptive weight (or the weight) W may be represented as Equation 1 below.

$$W = R_{tar} * 1/R \quad \text{[Equation 1]}$$

The processor 140 may apply the determined weight W to determine entropy E for the detected object. The processor 140 may be configured to determine the entropy E using Equation 2 below.

$$E = -\sum_{i=0}^{n} P_i \log P_i * W \quad \text{[Equation 2]}$$

Herein, $P_i$ may be defined as a probability that the object will belong to the ith class.

The processor 140 may compare the determined entropy E with a predetermined reference value (or reference entropy) and may be configured to determine whether to select object data based on the compared result. The processor 140 may be configured to determine whether the determined entropy E is greater than or equal to the predetermined reference value. When it is determined that the determined entropy E is greater than or equal to the predetermined reference value, the processor 140 may select data (or object data) of an object corresponding to the entropy as data needed to generate GT data (or data needed to be labeled).

Thereafter, the processor 140 may be configured to generate GT data for the selected object. The processor 140 may train a three-dimensional (3D) object detection model stored in the memory 130 using the generated GT data. The processor 140 may store the trained 3D object detection model in the memory 130.

Figure 2:
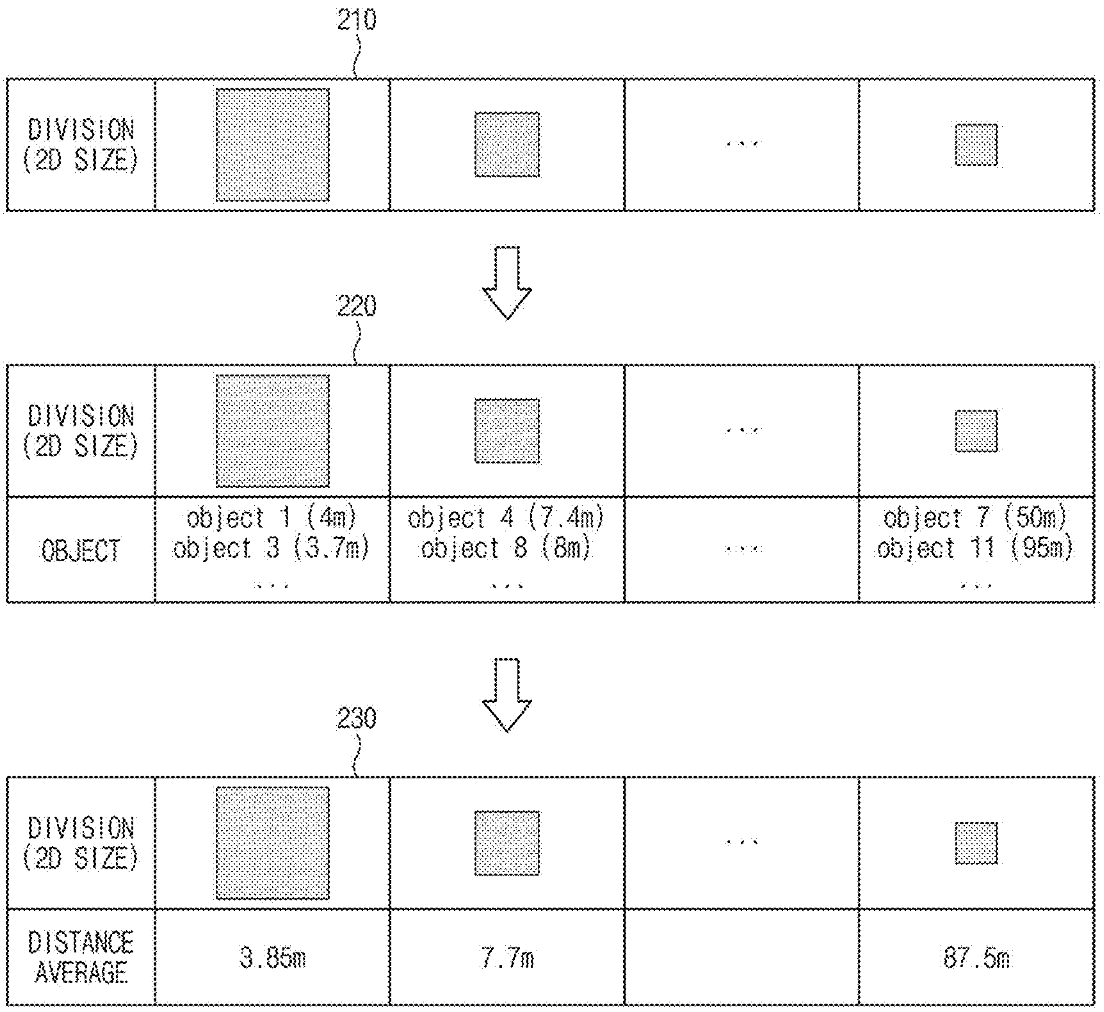
FIG. 2 is a drawing for describing object distance determination according to a box size according to various exemplary embodiments of the present disclosure.

FIG. 2 is a drawing for describing object distance determination according to a box size according to various exemplary embodiments of the present disclosure.

An electronic device 100 may statistically analyze an object distance according to a box size using pieces of data for a previously obtained object (e.g., a car, a bus, a truck, and/or the like).

First of all, a processor 140 of the electronic device 100 may store a plurality of pieces of predetermined box size information 210, which are input from the outside thereof, in a memory 130. The box size information 210 may include a two-dimensional (2D) size of a box, that is, a width and a height of the box.

The processor 140 may compare a size of a previously obtained object with the predetermined box size information 210. Herein, the size of the object may include a width and a height of a bounding box surrounding the object. The processor 140 may match a box size which is most similar to the size of the object. In other words, the processor 140 may class an object matched for each predetermined box size (refer to reference number 220).

The processor 140 may be configured to determine an average distance of the pieces of classified objects using distances of the pieces of classified object data. In other words, the processor 140 may be configured to determine an average distance of objects matched with the predetermined box size. The processor 140 may define an object distance for each predetermined box size using the determined average distance to generate a lookup table 230.

Figure 3:
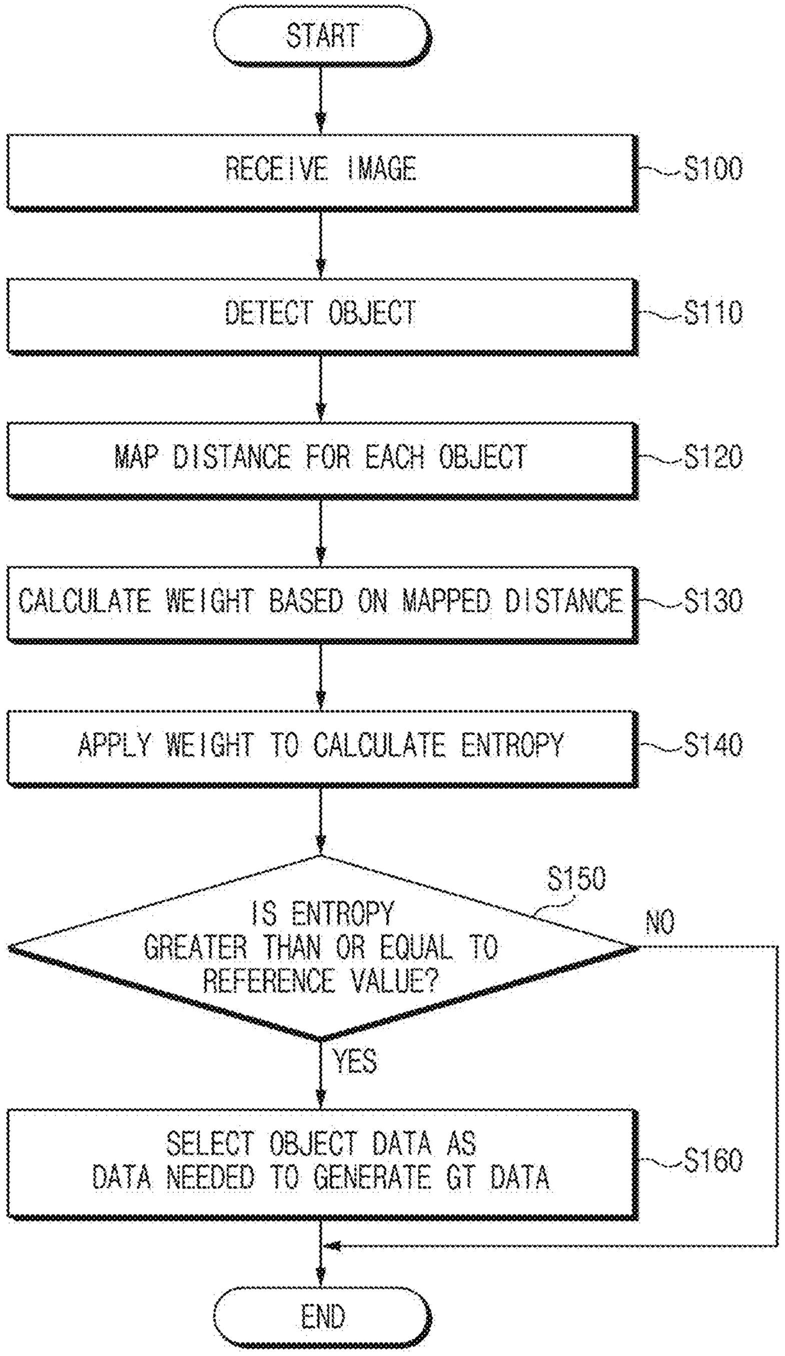
FIG. 3 is a flowchart illustrating a data selection method of an electronic device according to various exemplary embodiments of the present disclosure.
Figure 4A:
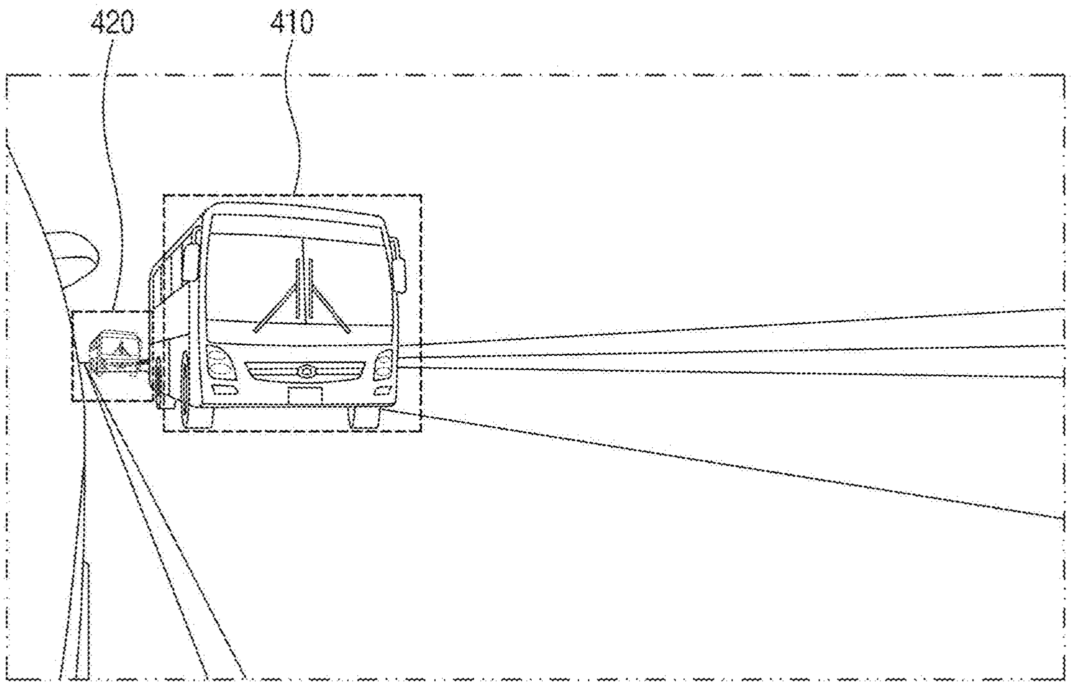
FIG. 4A is a drawing illustrating an example of detecting an object according to various exemplary embodiments of the present disclosure.
Figure 4C:
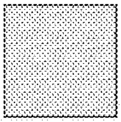
FIG. 4C is a drawing for describing weight determination according to various exemplary embodiments of the present disclosure.
Figure 4C:
Figure 4C:

FIG. 3 is a flowchart illustrating a data selection method of an electronic device according to various exemplary embodiments of the present disclosure. FIG. 4A is a drawing illustrating an example of detecting an object according to various exemplary embodiments of the present disclosure. FIG. 4B is a drawing for describing distance mapping for each object according to various exemplary embodiments of the present disclosure. FIG. 4C is a drawing for describing weight determination according to various exemplary embodiments of the present disclosure.

In S100, a processor 140 of an electronic device 100 may receive an image from a camera 110. The camera 110 may an image obtained by capturing the periphery of the camera 110 to the processor 140. The processor 140 may receive the image transmitted from the camera 110.

In S110, the processor 140 may detect at least one object (e.g., a vehicle) from the image. The object may be a vehicle. Referring to FIG. 4A, the processor 140 may detect a first object 410 and a second object 420 from an image in front of the vehicle, which is obtained by the camera 110. At the instant time, the processor 140 may detect an object from the image using a well-known object detection technology.

In S120, the processor 140 may map a distance (or an object distance) to the detected object with reference to a lookup table stored in a memory 130. Referring to FIG. 4B, the processor 140 may search for a first box size 430 which is most similar to a size of the first object 410 and may map a distance average, 7.7 m, corresponding to the found first box size 430 to a distance of the first object 410. Furthermore, the processor 140 may search for a second box size 440 which is most similar to a size of the second object 420 and may map a distance average, 87.5 m, corresponding to the found first box size 440 to a distance of the second object 420.

In S130, the processor 140 may be configured to determine a weight based on the mapped distance. The processor 140 may verify a target rate and a current rate, which correspond to the mapped distance. The target rate may be preset by a system designer or a user. The processor 140 may apply the target rate and the current rate to Equation 1 above to determine a weight. Referring to FIG. 4C, when each of the data acquisition target rate and the data acquisition current rate corresponding to the mapped distance, 7.7 m, of the first object 410 is "1", the processor 140 may be configured to determine a weight of 2 (=1/6*12/1) using the target rate and the current rate. When the mapped distance is 3.85 m, because the target rate and the current rate corresponding to the mapped distance are 4 and 10, respectively, the processor 140 may be configured to determine a weight of 0.8 (=4/6*12/10).

In S140, the processor 140 may determine entropy by use of the determined weight. The processor 140 may be configured to determine entropy for each object using Equation 2 above.

In S150, the processor 140 may be configured to determine whether the determined entropy is greater than or equal to a reference value.

When it is determined that the determined entropy is greater than or equal to the reference value, in S160, the processor 140 may select data for the object as data needed to generate GT data.

Figure 5:
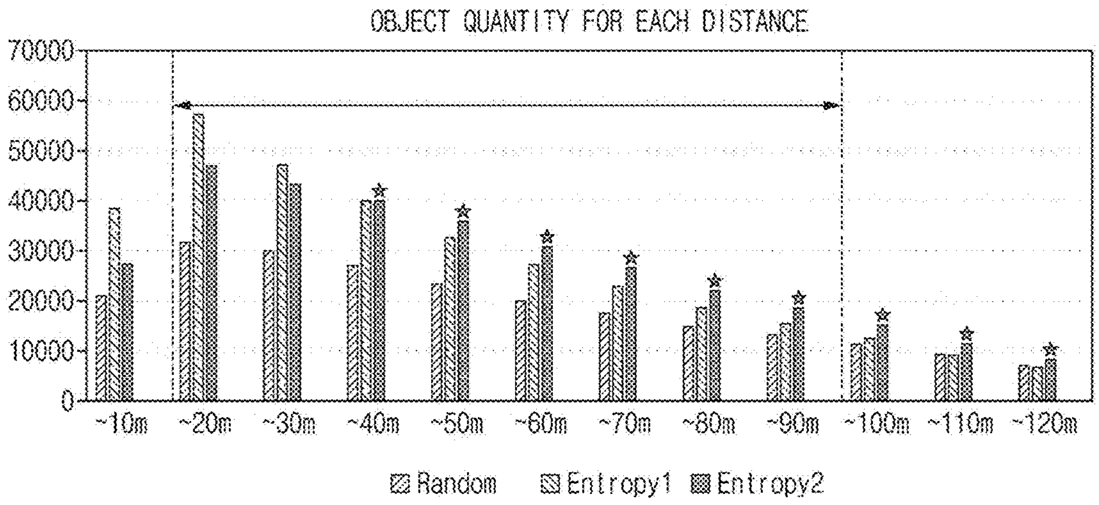
FIG. 5 is a drawing for describing an effect of a data selection method according to various exemplary embodiments of the present disclosure.

FIG. 5 is a drawing for describing an effect of a data selection method according to various exemplary embodiments of the present disclosure.

The data selection method according to various exemplary embodiments of the present disclosure may be to customize a distance weight for a predetermined region of interest (e.g., 20 m to 90 m). For example, when the detection goal of a rear side view camera is to detect an object within a distance of 20 m to 90 m, an electronic device 100 may apply a larger distance weight to the object within the distance of 20 to 90 m to select object data.

Referring to FIG. 5, it may be verified that active learning using distance weight-based entropy Entropy2 include more long range object data than existing active learning Random and entropy-based active learning Entropy1.

Figure 6:
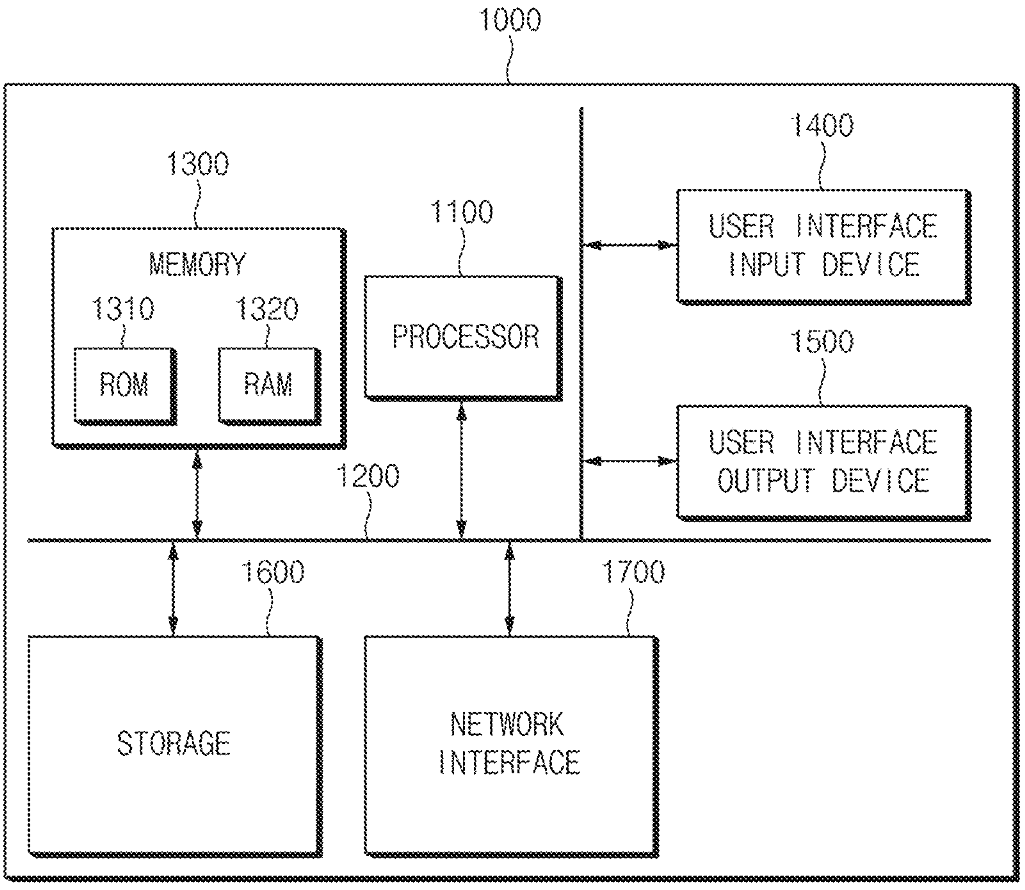
FIG. 6 is a block diagram illustrating a computing system for executing a data selection method according to various exemplary embodiments of the present disclosure.

FIG. 6 is a block diagram illustrating a computing system for executing a data selection method according to various exemplary embodiments of the present disclosure.

Referring to FIG. 6, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM. The exemplary storage medium may be coupled to the processor 1100. The processor 1100 may read out information from the storage medium and may write information in the storage medium. Alternatively, the storage medium may be integrated with the processor 1100. The processor 110 and the storage medium may reside in an application specific integrated circuit (ASIC). The ASIC may reside within a user terminal. In another case, the processor 1100 and the storage medium may reside in the user terminal as separate components.

Embodiments of the present disclosure may obtain object data for each distance in a balanced manner as well as object data for each class.

Furthermore, various exemplary embodiments of the present disclosure may select a data acquisition rate of a desired distance.

Furthermore, various exemplary embodiments of the present disclosure may variably adjust a weight based on a desired data acquisition quantity to generate an adaptive weight.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well-known to a person including ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic apparatus, comprising:
a camera configured to obtain an image; and
a processor operatively connected to the camera and configured to detect an object from the image,
wherein the processor is configured to:
estimate an object distance of the detected object;
determine a weight based on the estimated object distance;
determine entropy by use of the determined weight; and
determine whether to obtain data of the detected object based on the determined entropy.

2. The electronic apparatus of claim 1, wherein the processor is further configured to:
search for a box size which is most similar to a size of the detected object with reference to a lookup table; and
estimate a distance mapped to the found box size as the object distance of the detected object.

3. The electronic apparatus of claim 2, wherein the processor is further configured to:
match and classify an object with a size which is most similar for each predetermined box size to previously obtained objects;
determine an average distance of the classified objects for each box size; and
determine the determined average distance as the object distance according to the box size.

4. The electronic apparatus of claim 3, further including:
a memory operatively connected to the processor and storing the lookup table in which the object distance is defined according to the box size.

5. The electronic apparatus of claim 1, wherein the processor is further configured to:
set a data acquisition target rate corresponding to the estimated object distance;
verify a data acquisition current rate corresponding to the estimated object distance; and
determine the weight using the data acquisition target rate and the data acquisition current rate.

6. The electronic apparatus of claim 5, wherein the processor is further configured to determine the entropy by use of the determined weight and a probability value of a probability that the detected object will belong to a predetermined class.

7. The electronic apparatus of claim 1, wherein the processor is further configured to:
determine whether the entropy is greater than or equal to a predetermined reference value; and
select the data of the detected object corresponding to the entropy as data needed to generate ground truth (GT) data based on concluding that the entropy is greater than or equal to the reference value.

8. The electronic apparatus of claim 1, wherein the processor is further configured to detect the object from the image using a deep learning network.

9. The electronic apparatus of claim 8, wherein the deep learning network outputs a probability value of a probability that the detected object will belong to a predetermined class.

10. A data selection method of an electronic apparatus, the data selection method comprising:
obtaining an image using a camera;
detecting, by a processor operatively connected to the camera, an object from the image;
estimating, by the processor, an object distance of the detected object;
determining, by the processor, a weight based on the estimated object distance;
determining, by the processor, the entropy by use of the determined weight; and
determining, by the processor, whether to obtain data of the detected object based on the determined entropy.

11. The data selection method of claim 10, wherein the estimating of the object distance of the object includes:
searching for a box size which is most similar to a size of the detected object with reference to a lookup table; and
estimating a distance mapped to the found box size as the object distance of the detected object.

12. The data selection method of claim 11, further including:
matching and classifying an object with a size which is most similar for each predetermined box size to previously obtained objects;
determining an average distance of the classified objects for each box size; and
determining the determined average distance as the object distance according to the box size.

13. The data selection method of claim 12, further including:
generating the lookup table using the object distance according to the box size; and
storing the lookup table in a memory operatively connected to the processor.

14. The data selection method of claim 10, wherein the determining of the weight includes:
setting a data acquisition target rate corresponding to the estimated object distance;
verifying a data acquisition current rate corresponding to the estimated object distance; and
determining the weight using the data acquisition target rate and the data acquisition current rate.

15. The electronic apparatus of claim 14, wherein the determining of the entropy includes determining the entropy by use of the determined weight and a probability value of a probability that the detected object will belong to a predetermined class.

16. The data selection method of claim 10, wherein the determining of whether to obtain the data of the object includes:
determining whether the entropy is greater than or equal to a predetermined reference value; and
selecting the data of the detected object corresponding to the entropy as data needed to generate ground truth (GT) data based on concluding that the entropy is greater than or equal to the reference value.

17. The data selection method of claim 10, wherein the detecting of the data includes:
detecting the object from the image using a deep learning network.

18. The data selection method of claim 17, wherein the detecting of the data includes:
outputting, by the deep learning network, a probability value of a probability that the detected object will belong to a predetermined class.

* * * * *